Oct. 25, 1932.    G. S. SUPPIGER ET AL    1,884,365
APPARATUS FOR DISPENSING FLAVORING MATERIALS
Filed July 15, 1927    2 Sheets-Sheet 2
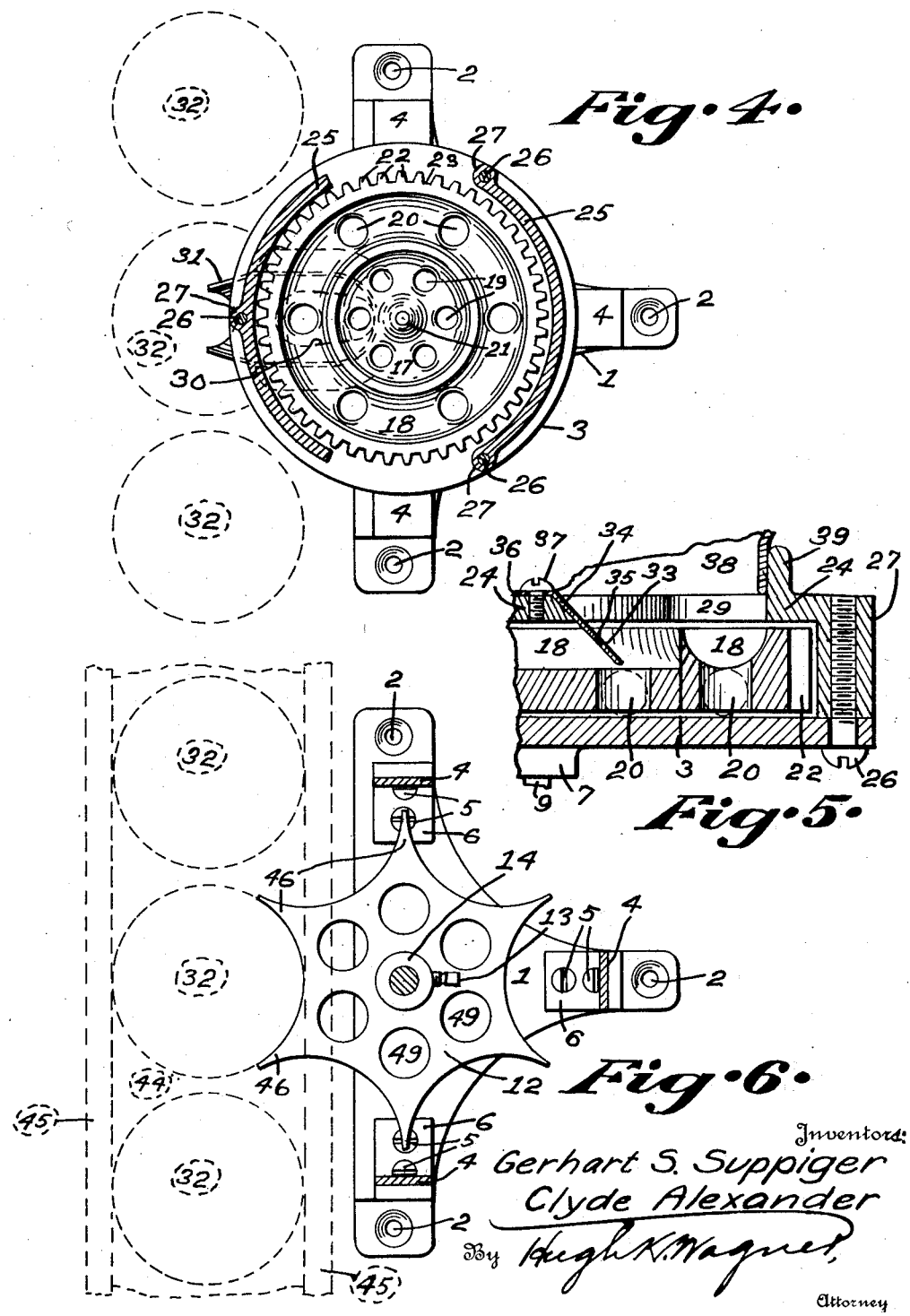

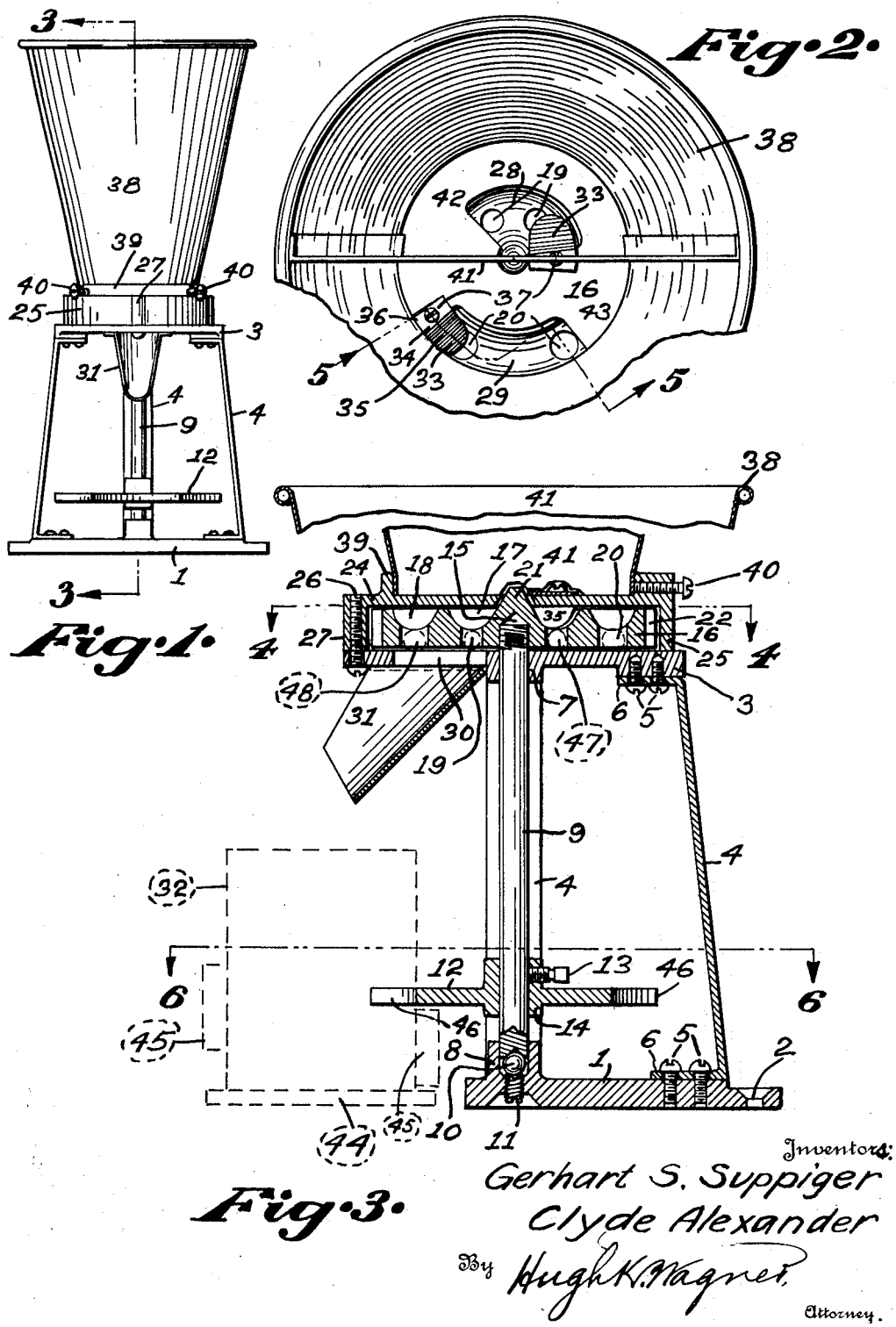

Patented Oct. 25, 1932

1,884,365

UNITED STATES PATENT OFFICE

GERHART S. SUPPIGER AND CLYDE ALEXANDER, OF BELLEVILLE, ILLINOIS, ASSIGNORS TO SCIENTIFIC TABLET COMPANY, OF EAST ST. LOUIS, ILLINOIS, A CORPORATION OF ILLINOIS

APPARATUS FOR DISPENSING FLAVORING MATERIALS

Application filed July 15, 1927. Serial No. 205,892.

This invention relates to an apparatus for distributing granulated flavoring materials, such as sugar, salt, and the like, in predetermined quantities to food products, such, for instance, as tomatoes, that have been placed in cans or receptacles in the course of packing them for the market.

In some canning plants it is the practice to add the flavoring materials to the filled receptacles by means of spoons in the hands of attendants stationed along a conveyor on which the receptacles are carried from one point of operation to another. This method of dispensing the flavoring material is objectionable because large amounts are spilled and wasted, and, moreover, there is a considerable variation in quantity between the successive charges of material that the spoons convey. Besides, the item of wages paid to the attendants or employees is, also, a desideratum.

Accordingly, this invention purposes to dispense the flavoring materials automatically, so as to insure precision and uniformity in the amounts distributed to the receptacles, to prevent spilling, and, also, to economize labor in the manufacture of the product.

A further object of the invention is to provide a dispensing machine that may be driven by the traveling movement alone of the receptacles on the conveyor, so that no additional source of power or driving mechanism is required.

Other objects and advantages, more or less incidental or ancillary to the foregoing, will appear in the course of the following description, which sets forth a preferred embodiment for the purpose of illustrating the invention.

In the accompanying drawings forming part of this specification, in which like numbers of reference denote like parts wherever they occur, Figure 1 is a front elevation of the machines;

Figure 2 is a fragmentary plan view;

Figure 3 is a vertical central sectional view taken on the line 3—3 in Figure 1;

Figure 4 is a horizontal sectional view taken on the line 4—4 in Figure 3.

Figure 5 is a vertical sectional view taken on the irregular line 5—5 in Figure 2; and Figure 6 is a horizontal sectional view taken on the line 6—6 in Figure 3.

The invention contemplates compressing predetermined quantities of the flavoring material into coherent masses or charges, preferably spherical or approximately spherical in form, so that they may be easily handled by the dispensing machine without packing or clogging the latter, as might occur if the material were passed through the machine in granulated form. Furthermore, since each charge is handled as a compact unit, the whole charge is dispensed simultaneously, without the possibility of a portion thereof preceding or lagging behind the major portion thereof, thereby insuring precision in dispensing the same.

The base 1 of the machine is provided with openings 2 for the reception of screws or bolts by means of which it may be fastened alongside a conveyor or other suitable support adjacent thereto. A plate or block 3 is disposed above the base 1 and secured thereto in spaced relation by spacer bars or uprights 4, secured to the said base and plate by means of screws 5, passing through flanges 6 of the said bars. Plate 3 is provided with a concentric bearing 7, that extends vertically therethrough and in alinement with a step bearing 8 in the base 1. A shaft 9 is journaled in the bearings 7 and 8, and is supported in the bearing 8 on a polished steel ball 10 that is supported on a set screw 11, screw-threaded into the base 1 from the bottom thereof, and by means of which the shaft 9 may be adjusted longitudinally. A star wheel 12 is affixed to the shaft 9 by means of a set screw 13, that passes in threaded relation into the hub 14 of the said star wheel.

The upper end of shaft 9 projects beyond the top of the plate 3 and is screw-threaded to fit the tapped hole 15, that opens into the bottom of a plate 16. Plate 16 is provided in its top face with one or more annular grooves, there being two such grooves, 17 and 18, respectively, shown in the present embodiment. An annular series of openings 19 extend through the plate 16 from the bottom of the inner groove 17, and another annular series of openings 20 extend through the plate 16 from the bottom of the outer groove 18, and preferably in radial alinement with the openings 19. The inner side of groove 17 preferably rises above the top face of the plate 16 to form a central conical boss 21. Gear teeth 22 are preferably formed around the annular lateral outer face 23 of the plate 16. A plate 24 is disposed over the plate 16 and presents depending circumferentially extending flanges 25, that partly enclose the plate 16 and rest on the plate 3 to maintain the plates 3 and 24 in spaced-apart relation. Plates 3 and 24 are secured together by means of screws 26, that pass in unthreaded relation through plate 3 and in threaded relation into bosses 27, formed on the flanges 25. Plate or disc 24 is provided with elongated openings 28 and 29 that overlie the grooves 17 and 18, respectively, in the rotary disc 16. Plate 3 is provided with an opening 30 that is preferably slightly wider than the opening 20 and is elongated radially so that any pair of openings 19 and 20 may be brought into registration therewith by rotating the disc 16 to the appropriate position. The openings 28 and 29 are disposed out of alinement with the opening 30, being preferably spaced ninety degrees therefrom and one hundred eighty degrees apart from each other. A spout 31 is secured to the underside of disc 3 around the opening 30, and conveys the flavoring material that is discharging from the opening 30 into the cans or receptacles 32. The openings 28 and 29 are provided with forwardly inclined surfaces 33, that is, surfaces that are inclined in the direction of rotation of the disc 16, and, in the illustrated embodiment, the disc rotates clockwise as viewed from the top. The surfaces 33 extend from near the bottom of the grooves 17 and 18 to the forward edges of the openings 19 and 20. The said surfaces may be formed on projections that are cast integral with the disc 24, or they may be formed of sheet metal projections 34 that are bent to present an inclined flange 35, and a horizontal flange 36, secured by means of screws 37 to the upper side of the disc 24.

A hopper 38, preferably of sheet metal, has its bottom edge supported on the plate 24, and is prevented from becoming displaced laterally by means of a flange 39, that rises from the plate 24 and surrounds the lower edge of the hopper. The hopper may be affixed to the plate 24 by means of set screws 40, that pass in threaded relation through the flange 39 and are adapted to bear against the outer side of the hopper. A partition 41 divides the hopper into compartments 42 and 43 that communicate with the openings 28 and 29, respectively.

The construction of the machine having been fully described, its operation will be readily understood. The machine is securely positioned along the side of a conveyor 44, that carries the receptacles 32, preferably between guides 45, that prevent lateral displacement of the receptacles. Assuming that the receptacles are moving away from the observer, Figure 3, they will engage the star wheel projections 46 that obstruct their path, so that each receptacle rotates the star wheel clockwise through sixty degrees, since there are six projections 46 thereon. The hopper or charge-retaining means 38 having been previously loaded with flavoring material, compartment 42, say, with spheres or tablets 47 of sugar, and compartment 43 with spheres or tablets 48 of salt, of such size that they can pass freely through the openings 19 and 20, but not more than one at a time, the rotation of discharger disc 16 agitates the spheres or charges that rest thereon and causes them to enter the openings 19 and 20, and, when the openings 19 and 20 that contain them are brought into registration with the opening 30, the charges 47 and 48 fall therethrough and down the spout 31 into the open receptacle 32 disposed immediately thereunder. The inclined projections 35 allow surplus charges to ride up out of the grooves 17 and 18, and thereby prevent them from being drawn in between the plate 24 and the bottoms of the grooves 17 and 18, the rounded sides and extent of the exposed portions of the moving grooves facilitating the agitation of the charges and their delivery to the openings 19 and 20. The conical projection 21 that rises from discharger 16 through the central opening in the bottom plate 24 also assists in the agitation.

The screw 11 is adjusted so that the weight of the discharger member 16, driving member 12, and shaft 9 is borne entirely by the ball 10, thereby reducing friction between the discharger member 16 and the bottom plate 3. The weight of the members 16 and 12 is minimized by casting them of aluminum, and openings 49 may be formed in the member 12 to further lighten the same. This construction allows the parts to be rotated with very little effort. The parts may be readily disassembled, and different sizes of star wheels may be used interchangeably to fit different sizes of cans 32.

If desired, additional hoppers may be provided and arranged so that their spouts all feed simultaneously into the same receptacle, the members 16 of the additional hoppers all being driven by the star wheel of the first hopper through intermediate gearing that meshes with the gear teeth 22 of the members 16.

Having thus fully described this invention, we hereby reserve the benefit of all changes in form, arrangement, order, or use of parts, as it is evident that many minor changes may be made therein without departing from the spirit of this invention or the scope of the following claims.

We claim:

1. A machine for dispensing pellets comprising a hopper having a bottom member provided with a discharge opening, a bottom wall supported in spaced relationship from the bottom member of said hopper, said bottom wall having a discharge opening, a rotatable plate mounted between the bottom member of the hopper and said wall provided with an annular groove in its upper surface overlying the opening in said wall and with an opening extending from the bottom of the groove to the undersurface of the plate, and a projection extending into said annular groove and adapted to remove surplus charges of pellets therefrom.

2. A machine for dispensing pellets comprising a hopper having a bottom member provided with an opening elongated circumferentially, a marginal flange connected with said bottom member, a wall secured to said flange and spaced from said bottom member, said wall having a discharge opening, a plate rotatably mounted on said wall and having an annular groove in its upper surface underlying the opening in the bottom member of the hopper and disposed across the discharge opening and provided with an opening extending from the bottom of the annular groove to the undersurface of the plate, and a projection affixed to the bottom member of the hopper and extending through the elongated opening therein to substantially the bottom of the annular groove and adapted to remove surplus charges of pellets therefrom.

3. A machine for dispensing pellets comprising a hopper having a bottom member provided with an opening elongated circumferentially, a marginal flange connected to said member and depending downwardly therefrom, a bottom wall secured to said flange provided with a discharge opening, a plate rotatably mounted on said bottom wall and provided with an annular groove in its upper surface underlying the opening in the bottom member of the hopper and disposed across said discharge opening, said groove being provided with spaced passageways to the undersurface of the plate, and a projection affixed to the bottom member of the hopper and extending through the elongated opening therein to substantially the bottom of the annular groove and adapted to remove surplus charges of pellets therefrom.

In testimony whereof we hereunto affix our signatures.

GERHART S. SUPPIGER.
CLYDE ALEXANDER.